(12) United States Patent
Schneider et al.

(10) Patent No.: US 9,074,457 B2
(45) Date of Patent: Jul. 7, 2015

(54) METHOD FOR MANAGING CHANNELING IN GEOTHERMAL RECOVERY OF HYDROCARBON RESERVOIRS

(75) Inventors: Fred Schneider, Calgary (CA); Lynn P. Tessier, Eckville (CA)

(73) Assignee: R.I.I. NORTH AMERICA INC., Calgary (CA)

(*) Notice: Subject to any disclaimer, the term of this patent is extended or adjusted under 35 U.S.C. 154(b) by 695 days.

(21) Appl. No.: 13/428,159

(22) Filed: Mar. 23, 2012

(65) Prior Publication Data
US 2012/0247773 A1 Oct. 4, 2012

Related U.S. Application Data

(60) Provisional application No. 61/470,062, filed on Mar. 31, 2011.

(51) Int. Cl.
*E21B 43/22* (2006.01)
*E21B 43/02* (2006.01)
*E21B 43/16* (2006.01)
*E21B 43/24* (2006.01)

(52) U.S. Cl.
CPC ............. *E21B 43/025* (2013.01); *E21B 43/168* (2013.01); *E21B 43/2408* (2013.01); *Y02E 60/324* (2013.01)

(58) Field of Classification Search
CPC ... E21B 43/168; E21B 43/2408; E21B 43/16; E21B 43/24; E21B 43/243; E21B 43/162; Y02E 60/324; C09K 8/426
USPC ............... 166/272.3, 272.6, 250.15, 60, 270, 166/270.1
See application file for complete search history.

(56) References Cited

U.S. PATENT DOCUMENTS

| | | | | |
|---|---|---|---|---|
| 4,074,757 A | * | 2/1978 | Felber et al. | 166/261 |
| 4,431,055 A | * | 2/1984 | Parrish | 166/250.15 |
| 5,071,890 A | * | 12/1991 | Shu et al. | 166/288 |
| 8,789,608 B2 | * | 7/2014 | Betzer-Zilevitch | 166/369 |
| 8,851,169 B2 | * | 10/2014 | Nikipelo | 166/272.1 |
| 2013/0020076 A1 | * | 1/2013 | Schneider et al. | 166/261 |

* cited by examiner

*Primary Examiner* — Kenneth L Thompson
*Assistant Examiner* — Michael Wills, III
(74) *Attorney, Agent, or Firm* — Goodwin Law; Sean W Goodwin

(57) ABSTRACT

High permeability channels or wormholes found in hydrocarbon reservoirs having hydrocarbon-bearing formations can be remediated by heating the formation with dry, hot flue gases, injecting produced water into the formation through an injection well, and forming steam within the formation and spaced away from the injection well. The steam can be created at a steam generation interface occurring between a dry, hot gaseous drive front and an injected water front. Managing a quality of the steam formed along the steam generation interface, by increasing the combustion gas flow rate or decreasing the rate of water injection, allows for the initiation of precipitation and controlled deposition of solids dissolved in the produced water.

17 Claims, 9 Drawing Sheets

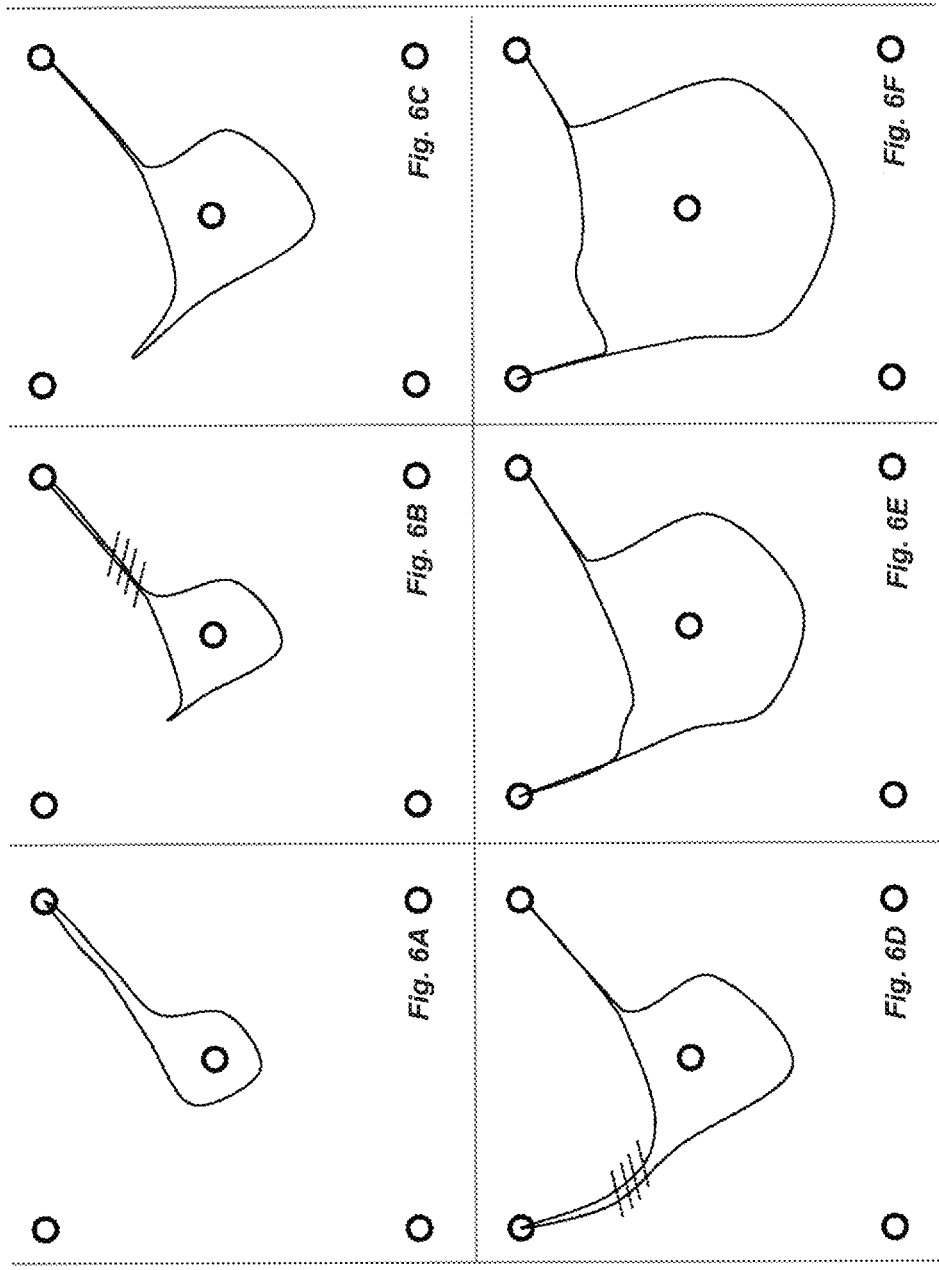

METHOD FOR MANAGING CHANNELING IN GEOTHERMAL RECOVERY OF HYDROCARBON RESERVOIRS

CROSS REFERENCE OF RELATED APPLICATIONS

This application claims the benefits under 35 U.S.C 119(e) of the U.S. Provisional Application Ser. No. 61/470,062, filed Mar. 31, 2011, which is incorporated fully herein by reference.

FIELD

Embodiments made herein relate to a process for remediating high permeability channels found in hydrocarbon reservoirs having hydrocarbon-bearing formations. More particularly, produced water containing dissolved solids is converted into steam within a formation, the quality of which is manipulated for management of precipitation of the dissolved solids therefrom.

BACKGROUND

Some hydrocarbon reservoirs having hydrocarbon-bearing formations are characterized by one or more incidences of high permeability channels within a formation, which can interfere with effective primary, secondary or enhanced recovery of the hydrocarbons found in lower permeability portions of the formation. High permeability channels can be pre-existing, result from, or can be accentuated by previous production activities. During enhanced oil recovery (EOR), high permeability channels, between injector wells (injectors) and production wells (producers), can cause various EOR drive fronts to bypass virgin oil in less permeable zones and cause early breakthrough of the various drive fronts at one or more of the producers.

One production activity that can result in the formation of high permeability channels is the production of heavy or super-heavy oil from formations or formations containing substantial amounts of sand. Typically, the production of heavy and super-heavy oil can include drilling a vertical or slant well into the formation having high sand content. It was common practice, during primary oil production, to exclude sand from the formation by the use of screens or gravel packs. However, it is now better understood in the heavy oil exploitation industry, that the exclusion of sand during primary oil production is not very economical, having a rate of production of about 0.5-5 $m^3$/day.

Therefore, one technique developed for production of heavy or super-heavy oil includes cold heavy oil production with sand (CHOPS). In CHOPS, sand ingress or influx is initiated and sustained as a mixture of sand and oil throughout primary oil production which results in production rates as high as 15-50 $m^3$/day (Dusseault, Maurice, *CHOPS: Cold heavy Oil Production with Sand in the Canadian Heavy Oil Industry*, The Alberta Department of Energy, March 2002).

As the mixture of oil and sand is produced from the hydrocarbon-bearing formation, finer sand is evacuated from the formation, allowing larger particles to consolidate within the formation. This creates high permeability channels within the formation which has been a benefit to the improved transport of heavy oil during primary oil production.

After primary oil production, Cyclic Steam Stimulation (CSS) has been used in combination with CHOPS(SPE 138091), with periodic steam injection from an injection well. But CSS is characterized by the flow of steam preferentially through the high permeability channels or wormholes, which can extend to nearby production wells, rendering further CSS ineffective.

These wormholes and other high permeability pathways or channels render ineffective most EOR methods, which rely on drive fluids, such as water, steam, chemical, and/or gas, usually applied as dispersed as possible in a formation along a drive front.

Prior art EOR techniques include the injection of steam into the formation through an injection well for hydrocarbon recovery at a spaced away production well. As a steam front permeates throughout the formation, the heat from the steam lowers the viscosity of the heavy oil and urges the heavy oil into the nearby production wells. However, high permeability channels acts as a channel within the formation and allow the steam drive to bypass residual, virgin cold heavy oil in less permeable portions of the formation, flowing preferentially along the high permeability channels, to break through at a production well, minimizing the effectiveness of the EOR technique.

Extraordinary methods have been proposed for blocking high permeability channels, including a gel-foam system for creating a stable foam in the channels for the duration of the gelation time.

Further, injection of steam in EOR techniques has also been associated with formation damage. Steam is often generated from produced water. Often a majority of produced water is condensed steam that has been originally injected in other recovery processes, some of which being formation water. After removal of co-produced hydrocarbons, the remaining water is purified as produced water. The geothermal effect of injecting produced water for creating steam downhole is poorly understood. However, much literature has been directed to the discussion of formation damage due to fines migration, inorganic scaling, emulsion blockage, asphaltenes and other organic deposition (see Journal of Applied Sciences, 7 (21). pp. 3198-3207. ISSN 1812-5654).

One method in the prior art, downhole or in-situ generation of steam has been the formation or steam at a downhole burner by injecting produced water into the downhole burner. This requires pre-treatment of produced water to prevent solids deposition or scaling in the downhole burner. In-situ created steam for enhanced oil recovery (EOR) is typically formed at the downhole burner using water produced from other production operations. Often, such produced water contain dissolved or suspended solids, produced solids such as sand or slit, and injected fluids and additives that may have been placed in the formation as a result of exploration and production activities (Veil, John A., et al., *White Paper Describing Produced Water from Production of Crude Oil, Natural Gas, and Coal Bed Methane*, Argonne National Laboratory, January 2004).

Scale deposition or scaling is deemed to be one of the most serious formation problems, understood to be primarily due to the incompatibility of injected steam and connate water. Thus prior art techniques, using produced water, often implemented pre-treatment of the produced water to remove dissolved solids that may cause solid deposition and scaling at the injection well.

However, there is still a need for a methodology for blocking high permeability channels for EOR which combines the benefits of disposal of produced water, and does not introduce new components into the formation.

SUMMARY

Hydrocarbon reservoirs, having hydrocarbon-bearing formations subject to high permeability channels, can be managed using judicious deposition of dissolved solids from produced water injected into the formation. Applicants have recognized that steam, created from produced water containing dissolved solids, can be formed remote from the injection well and within the hydrocarbon-bearing formation, spaced away from an injection well. The steam can have a quality which can be manipulated to initiate precipitation and control deposition of the solids within in high permeability channels.

In contradistinction to the experiences of the prior art, Applicants utilize produced water for in-situ generation of steam within the formation. The steam is generated away from the injection well and the quality of the steam is managed to control solids deposition to avoid solids deposition adjacent the injection well and obviate a prior art need for significant water pre-treatment.

Managed solid deposition aids EOR by remediating, restricting or blocking high permeability channels found in the formation so that EOR fluids, such as steam, are encouraged to venture into the previously un-contacted or virgin zones of the formation. The virgin zones often contain a majority of the heavy oil, these zones having been previously bypassed in prior EOR process or unrecoverable using currently practices prior art techniques.

In an embodiment, a process is provided for managing solids deposition in a hydrocarbon-bearing formation of a hydrocarbon reservoir. A formation is heated by injecting dry, hot flue gases from an injection well for creating a dry gaseous drive front which expands radially outwardly away from the injection well and generally upwardly in the formation. Water containing dissolved solids is injected into the formation, above a downhole burner in the injection well, for creating an injected water front which expands radially outwardly away from the injection well and generally downwardly in the formation. In formations having one or more high permeability channels, a portion of the injected fluids preferentially travel along the one or more high permeability channels.

Steam is formed within the formation at a steam generation interface occurring between the dry gaseous drive front, being hot enough to vaporize injected water, and the injected water front, the steam generation interface being spaced away from the injection well. A quality of the steam at the steam generation interface is managed for initiating precipitation and controlled deposition of the dissolved solids from the injected water within the formation. Precipitation occurs along the steam generation interface intersecting the one or more high permeability channels for reducing the permeability thereafter. Solids deposition can include particulate formation or scaling or a combination of both. One method of providing dry, hot flue gases is to operate a downhole burner.

In one aspect, a method for remediating high permeability channels in a hydrocarbon-bearing formation of a hydrocarbon reservoir involves heating the formation having one or more high permeability channels, injecting produced water containing dissolved solids, forming a steam front in the formation, and managing steam quality at the steam front for forming a steam generation interface intersecting one or more of the high permeability channels for initiating precipitation and controlling deposition of the dissolved solids within the high permeability channels.

In another aspect, a method for remediating high permeability channels in a hydrocarbon-bearing formation involves heating the formation by injecting hot flue gases into the formation from an injection well for creating a dry gaseous drive front, injecting water containing dissolved solids into the formation above the dry gaseous drive front for creating an injected water front, forming steam within the formation at a steam generation interface occurring between the dry gaseous drive front and the inject water front, the steam generation interface being spaced away from the injection well, and managing a quality of the steam for initiating precipitation and controlling deposition of the dissolved solids into the high permeability channels.

In another aspect the dry, hot flue gases are produced by a downhole burner, the dry, hot flue gases permeate through the formation as a dry, gaseous drive front, the front expanding generally upwardly in the formation and radially outwardly away from the burner and the injection well. Produced water is injected into the formation through the injection well above the burner and the dry, gaseous drive front and is allowed to permeate through the formation, expanding downwardly and radially outwardly from the injection well as an injected water front. At least a portion of the injected water travels along the high permeability channels. The dry, hot gaseous drive front and the injected water front combine within the formation at a steam generation interface to form steam within the formation and spaced away from the burner and injection well.

In another aspect, the rate of one or both of the injected water or heat produced by a downhole burner are controlled for creating high quality steam, such as that greater than at least about 85% dry steam, at a steam generation front which causes dissolved solids in the water to precipitate out and form deposits within the formation. High permeability channels, transporting a higher proportion of the dry steam, will experience solids deposition. Along the high permeability channels, as the steam generation front travels farther away from the downhole burner, heat or energy available per unit of injected water decreases, eventually reaching a steady state or saturation equilibrium between the higher quality steam and lower quality steam which retains the dissolved solids. Manipulation of the equilibrium at the steam generation front can initiate precipitation of the dissolved solids retained in the lower quality steam.

In another aspect, produced water containing dissolved solids is injected above a combustion cavity at a first flow rate for creating a first wet quality steam at the steam generation interface, such as about 40% to about 85% steam quality, which is sufficient to retain a substantial portion of the dissolved solids therein. The first wet quality steam, carrying dissolved or entrained solids therewith, is permitted to permeate through the formation for enhanced EOR.

For some formations, higher permeability channels can be encountered, which is typically evidenced by a rapid temperature response at a producer well. Due to the high permeability, the wet steam preferentially permeates or travels along such high permeability channels to report at a particular production well, the wet steam drive front bypassing otherwise recoverable hydrocarbons remaining in virgin portions or zones of the formation. Further, the high flow rate of the steam and combustion gases along the high permeability channels preferentially and locally heat the immediate vicinity of the channels resulting in ineffective heat transfer to virgin portions of the formation. Accordingly, to better affect the virgin portions, the heat balance is manipulated to change the wet steam into dry steam for initiating precipitation and deposition of dissolved solids in the pre-heated high permeability channel, retarding flow therealong and urging more of the drive front and heat into the virgin zones.

One or both of water injection rate and burner heat output rate can be varied to increase the ratio of thermal supply to water load, thereby increasing the quality of the steam. In one embodiment, produced water is injected at a second reduced flow rate for creating steam at a second dry quality, or dry steam. The conversion of produced water to dry steam flowing along the high permeability channels initiates deposition of the solids, thereby remediating and reducing the permeability of the high permeability channels, and thus increasing the drive into other zones of the formation.

Once high permeability channels have been blocked, restricted or otherwise remediated, steam quality can be adjusted again to a lower quality to resume transport of entrained solids with the steam drive front. This wet-to-dry-to-wet steam quality process can be repeated as subsequent or additional channels are encountered.

Regardless of an initial or staged steam control, deposition of solids as particulates or scaling causes the high permeability channels to plug or otherwise restrict the porosity of the channels, thereby reducing the ability of fluids, such as water, steam, chemicals, and/or gases, to bypass the virgin heavy oil. As a result, one can increase the effectiveness of EOR.

BRIEF DESCRIPTION OF THE DRAWINGS

FIG. 6A is a representative drawing, illustrating a high permeability channel between an Injector I and a Producer A, encountered during EOR;

FIG. 6B is a representative drawing of the embodiment of FIG. 6A, illustrating the high permeability channel between Injector I and Producer A plugged or blocked after management of the flow rate of injected water or heat supply;

FIG. 6C is a representative drawing of the embodiment of FIG. 6B, illustrating the encountering of another high permeability channel between the Injector I and Producer B;

FIG. 6D is a representative drawing of the embodiment of FIG. 6C, illustrating the high permeability channel between Injector I and Producer B plugged or blocked after management of the flow rate of injected water heat supply;

FIG. 6E is a representative drawing of the embodiment of FIG. 6D, illustrating an expansion of a wet steam front; and FIG. 6F is a representative drawing of the embodiment of FIG. 6E, illustrating the continued expansion of the wet steam front.

DETAILED DESCRIPTION

Herein, embodiments of the invention are discussed in the context of a typical CHOPS produced heavy oil reservoir wherein high permeability channels (wormholes) develop through a hydrocarbon-bearing formation, often connecting between injection wells and production wells. Other formations are also known to be subject to high permeability channels, which reduce the effectiveness of EOR. The existence of high permeability channels makes it difficult to then apply any form of secondary recovery or enhanced oil recovery (EOR) processes involving injected fluids. The channels allow injected fluids to simply short circuit or bypass any heavy oil found in virgin zones not contacted by the drive fluids, reducing the overall effectiveness of any EOR processes.

Through application of embodiments disclosed herein, it is possible to manipulate a quality of steam in the formation to promote solids deposition, thereby targeting and reducing permeability within the high permeability channels to redirect or distribute drive fluid into those virgin areas or zones of the formation that have not previously come into contact with the steam.

One embodiment disclosed herein involves steam generation within a CHOPS heavy oil formation using in-situ steam generation. A phase change from produced water, which contains and entrains dissolved solids, to steam occurs at a steam generation interface within the formation between produced water and dry and hot combustion gases, both of which have permeated through the heavy oil formation. In-situ steam generation occurs within the formation and not at the injection well and in this illustration, heat is supplied from a downhole burner.

Produced water, such as those containing dissolved or suspended solids, produced solids such as sand or slit, and injected fluids and additives, used in the process described herein, will typically have high total dissolved solids (TDS) and is injected into the formation independent from the combustion process at the downhole burner.

Figure 1:
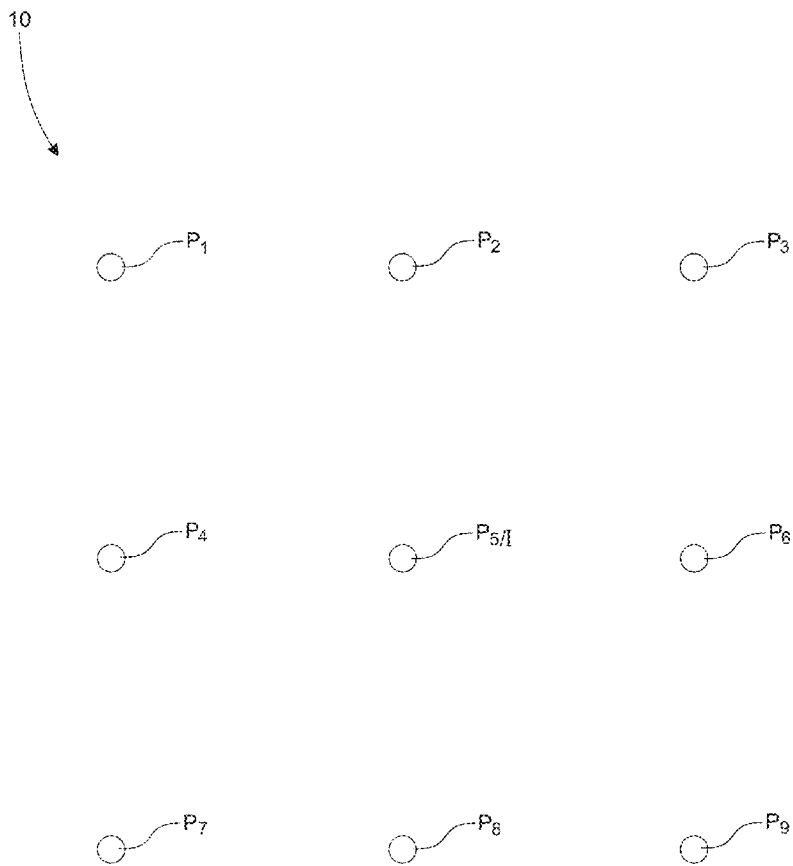
FIG. 1 is a plan view of a typical pad of primary production wells arranged in a 3×3 grid, wherein a central production well can be later used as an injection well for EOR procedures.

With reference to FIG. 1, a typical pad 10 of primary production wells can have a total of 9 production wells or producers $P_1$ to $P_9$ arranged in three rows of three producers, each producer being spaced substantially apart from one another. After primary production, the central producer $P_5$ can be used as an injection well or injector I for EOR operations.

Figure 2:
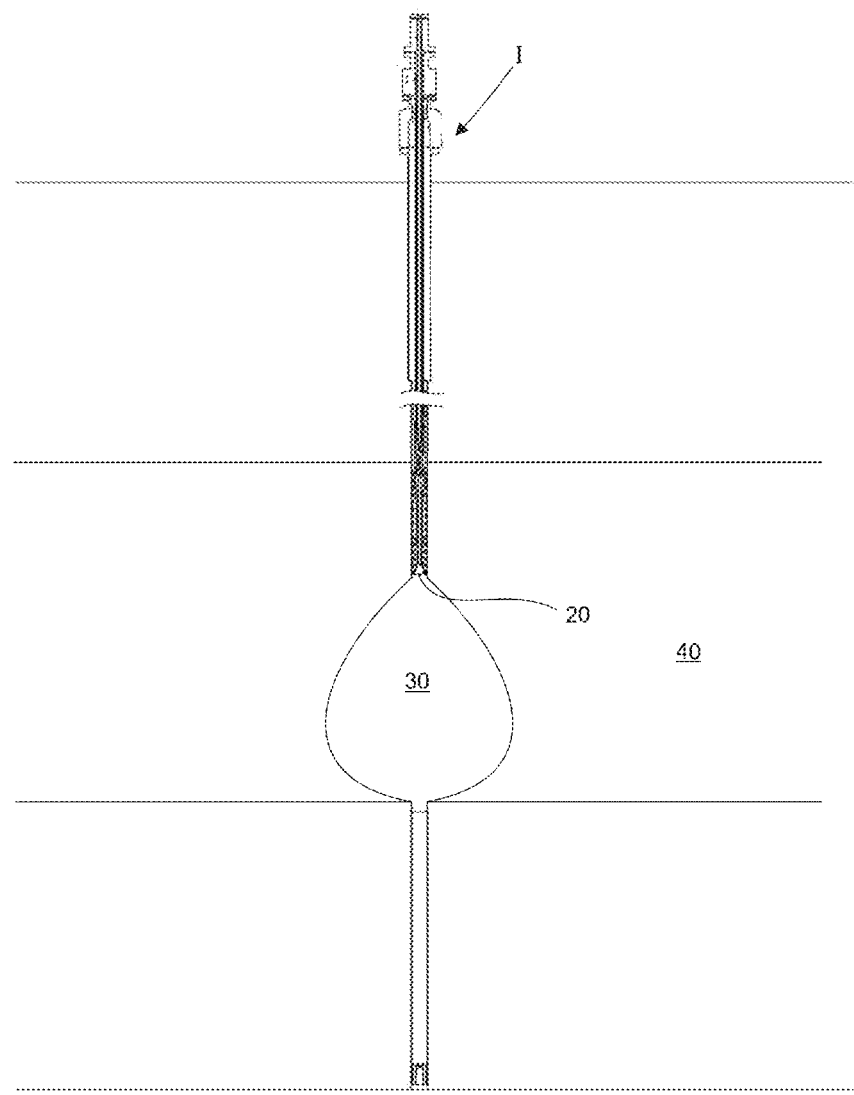
FIG. 2 is a representative drawing of a downhole burner positioned in an injection well within a hydrocarbon-bearing formation for generating dry, hot flue gases.

With reference to FIG. 2, the injection well or injector I is used to dispense or inject dry, hot flue gases and secondly to conduct produced water to a formation. In an embodiment, the means for injecting the dry, hot flue gases can comprise a downhole burner 20 within the hydrocarbon-bearing formation 40 of a hydrocarbon reservoir which can produce hot combustion gases for permeating through the formation 40. As disclosed in Applicant's pending published US Patent Application US 2010/0181069, which is incorporated by reference in its entirety herein, the downhole burner 20 can comprise a burner having a casing seal for sealing against the injection wellbore and injecting water into the formation 40 above a combustion cavity 30.

Figure 3A:
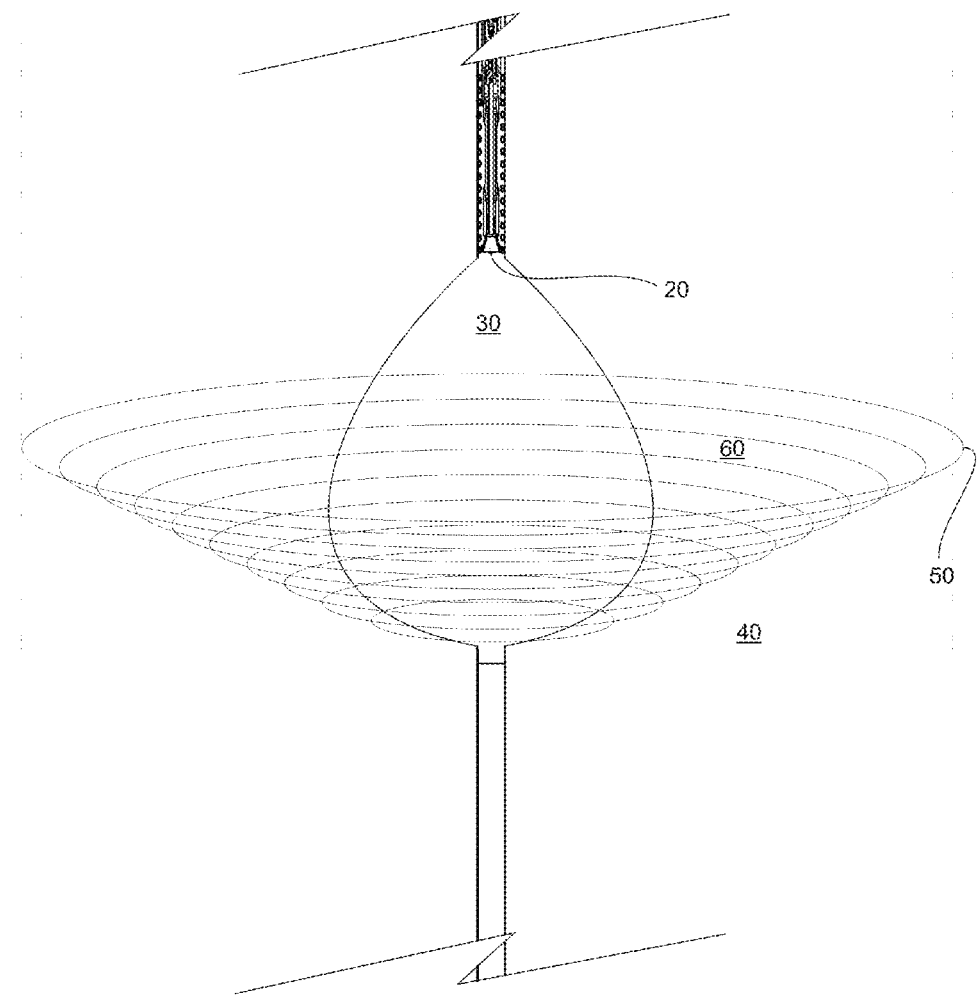
FIG. 3A is a representative drawing of dry, hot flue gases expanding radially outwardly away from a combustion cavity and generally upwardly in homogeneous formation as a dry gaseous drive front.

As shown in FIG. 3A, a steady state operation of the burner 20, such as after formation of the combustion cavity 30, creates the dry, hot combustion or flue gases that permeate through the formation 40 as a dry, hot gaseous drive front 50 for creating a combustion gas zone 60. The hot combustion gases, as a result of their buoyancy, permeate or expand radially away and upwardly from the combustion cavity 30 and the injection well I. Thus, in an ideal homogeneous formation, Applicant believes the combustion gas zone 60 can expand in a substantially conical shape, expanding radially away from the combustion cavity 30 and upwardly in the formation 40.

Figure 3B:
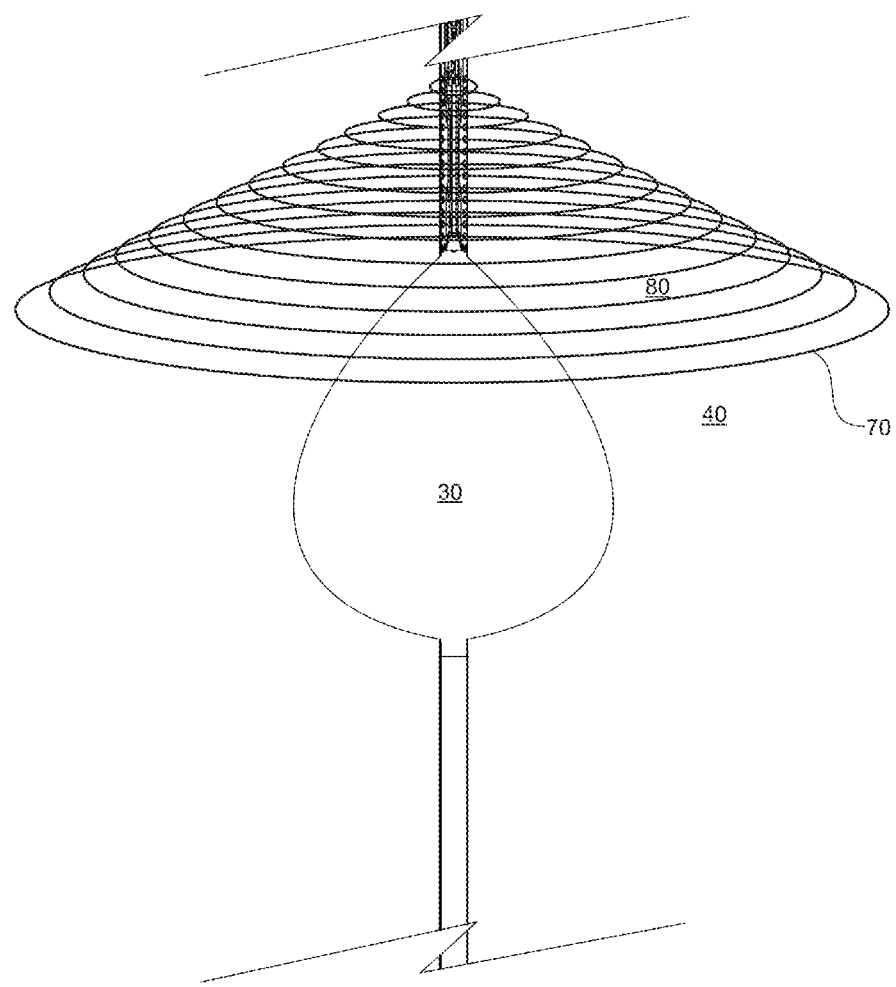
FIG. 3B is a representative drawing of water being injected above a downhole burner and a combustion cavity, the water expanding radially outwardly away from the injection well and generally downwardly in a homogeneous formation as a injected water front.
Figure 3C:
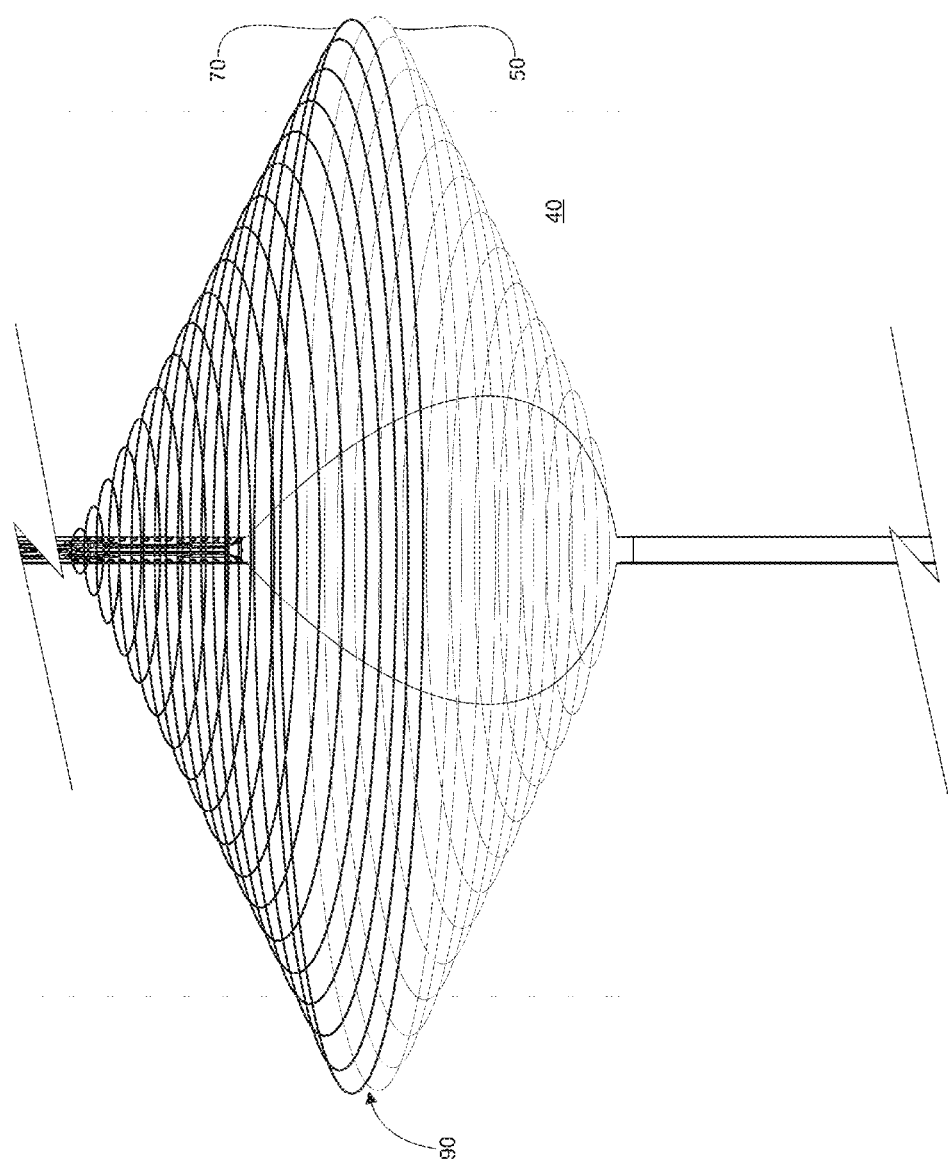
FIG. 3C is a representative drawing of the embodiment in accordance to FIGS. 3A and 3B, illustrating the formation of a steam generation interface between the dry gaseous drive front and the injected water front.
Figure 3D:
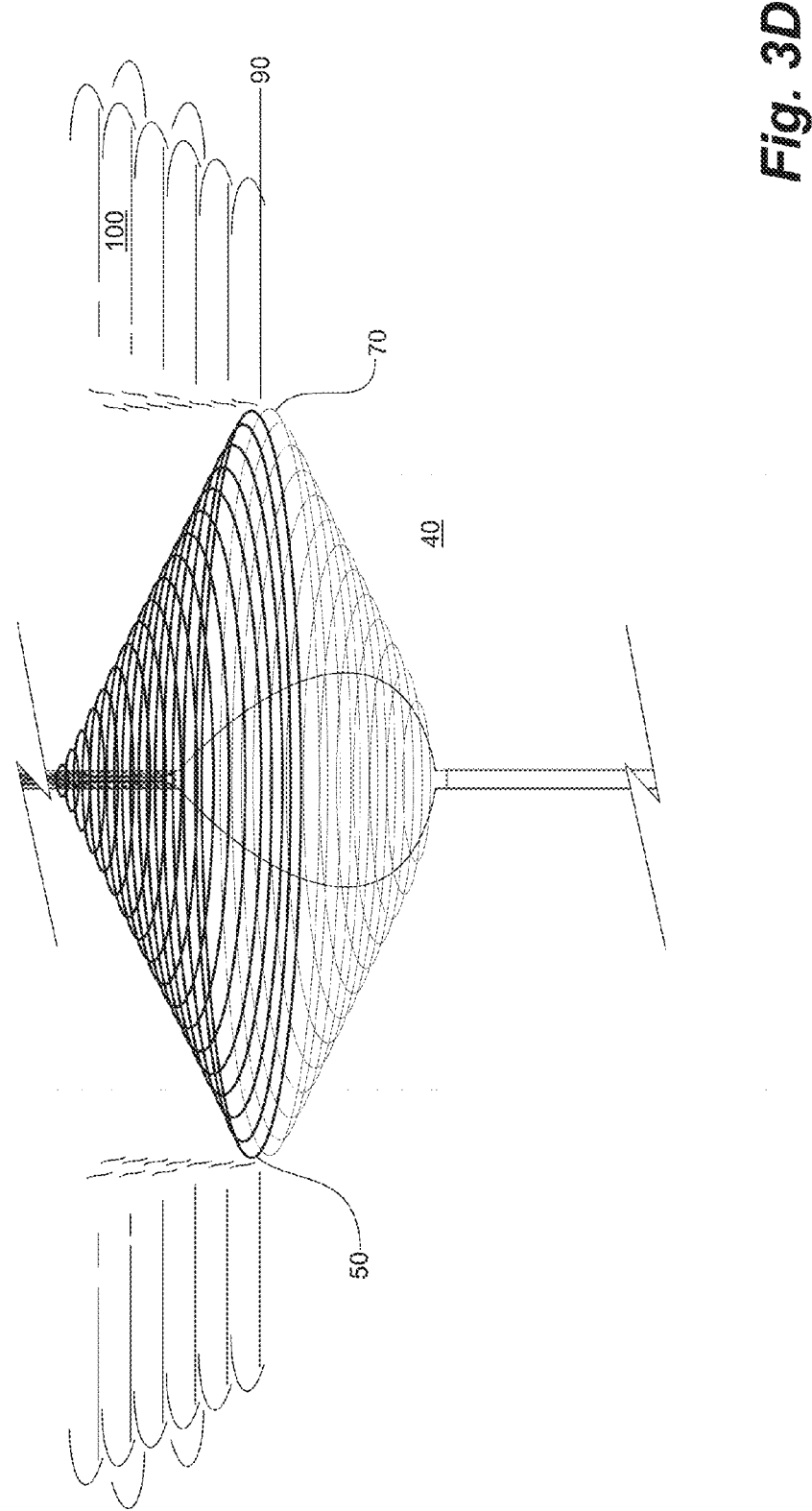
FIG. 3D is a representative drawing of the embodiment in accordance to FIG. 3C, illustrating expansion of a steam zone, expanding radially outwardly away from the combustion cavity, and upwardly in the homogeneous formation.

With reference to FIGS. 3B, 3C, and 3D, produced water is injected above the dry, hot gaseous drive front 50, such as through injection above the burner 20 or combustion cavity 30, and allowed to permeate throughout the formation 40 as an injected water drive front 70 for creating a water injection zone 80. The injected water drive front 70 can expand radially outwardly away from the injection well I, and due to gravity, flows downwardly in the formation 40 to contact the dry gaseous drive front 50 and the gas combustion zone 60 to form in-situ steam at a steam generation interface 90 within the formation 40. In a hypothetical homogeneous formation, the water injection zone 80 would be in a substantially conical shape.

Figure 4:
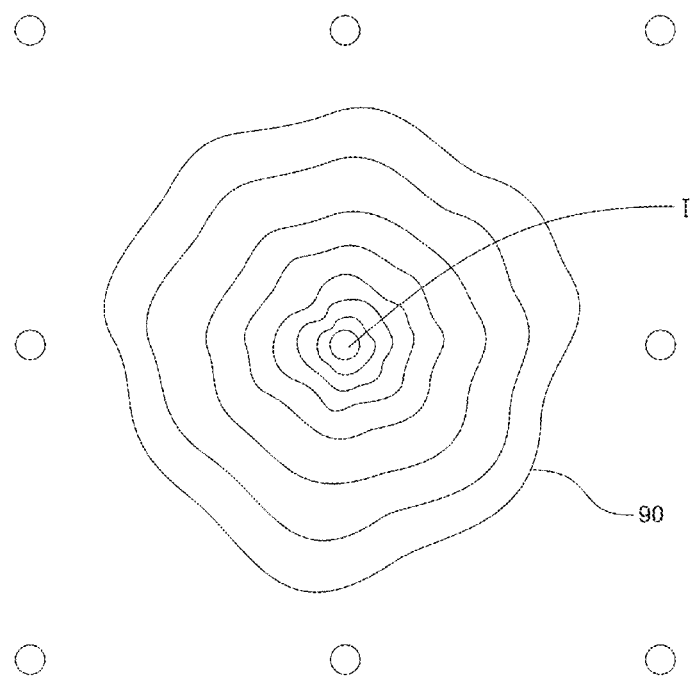
FIG. 4 is a representative plan drawing of the embodiment in accordance to FIG. 3D, illustrating expansion of the steam generation interface away from the injection well towards nearby producing wells.

With reference to FIGS. 3D and 4, the steam generation interface 90 occurring between the gaseous drive front 50 and the injected water front 70, form a steam zone 100 which expands radially outwardly away from the injection well I and permeates through the formation 40. In a homogeneous formation, the interface 90 forms at the intersection of the injected water and gaseous drive fronts 70, 50.

The process takes advantage of the buoyancy of the dry, hot flue gases urging the gases to permeate towards the surface, while gravity urges the injected produced water downwards. Solids deposition, dependent upon steam conditions, will occur at the interface between the dry, hot flue gases and injected water. Flue gases and water will preferentially flow along the highest permeability channels available, water flowing downwards due to gravity, and the flue gases rising due to buoyancy.

Solids deposition creates an ever expanding steam generation interface and steam zone, propagating the formation with heat and water while moderating steam generation.

As shown in FIG. 4, the in-situ steam generation interface moves away from the injection well I to an ever increasing extent, being propelled away from the injection well I by the pressure gradient between injection and production wells.

As shown in FIGS. 6A to 6F, in cases where one or more high permeability channel exists, the water and gas fronts do not intersect at the ideal conical form and instead distend along the channel. The injected water and steam are drawn away from the desired and distributed sweep or permeation pattern to bypass virgin hydrocarbon-bearing zones of the formation. Accordingly, one is encouraged to manipulate the EOR process for stimulating precipitation or deposition of solids in the one or more high permeability channels. A ratio of available thermal energy to water can be increased to apply a greater amount of heat per unit of injected water. The increased amount of heat per unit of injected water produces increasingly higher quality (or drier) steam at the steam generation interface, causing the dissolved solids to exceed a solubility limit of the remaining injected water, thereby decreasing the dissolved solids carrying capacity of the injected water and initiating precipitation of the dissolved solids, such as forming particulates, scaling on other particulates, or a combination of both, in the surrounding formation, particularly in the high permeability channels.

In another embodiment, one can decrease the water injection rate for increasing the in-situ steam quality sufficient to also initiate precipitation and deposition of the dissolved solids within the channels. The reduced water injection rate increases the heating of the formation or the amount of heat energy available per unit of injected water for causing the dissolved solids to exceed the solubility limit, and thus decreases the dissolved solids carrying capacity of that unit of injected water. In another embodiment the combustion process is increased to provide more thermal energy. In another embodiment, the water injection rate is decreased and the thermal energy increased, such as increased combustion at the downhole burner. Increasing the heating of the formation, or decreasing the rate of water injection, or a combination of both can eventually move the steam generation front further away from the injection well.

Reduced permeability of the channels, as a result of solids deposition results in more equitable distribution of the in-situ steam zone throughout the formation. Steam propagates into the virgin areas of the formation and thus increases sweep or permeation efficiency and recovery factors. A steam front or flow can follow the path of least resistance within the formation, resulting in a substantially radial flow away from the injection well. As the thermal energy is spread over a larger and larger area, the hot combustion gases cool, and the steam generation interface is maintained at a steady state location in the formation.

Herein, as steam is generated in-situ within the formation, spaced from the injection well, and not distributed as steam directly from the injection well, the contemporary understanding of solids falling out of solution and precipitating in a cylindrical fashion surrounding the injection wellbore is not applicable. The use of in-situ generation of steam in the formation, which can be manipulated to form dry steam, encourages any solids deposition to occur at the interface between the more buoyant hot combustion gases and the injected, gravity draining, produced water. That interface is located within the formation and spaced away from the injection well.

Referring back to FIGS. 3A-4, in a homogeneous formation, Applicant believes that steady state operation of the downhole burner 20 causes the combustion gas zone 60 to gradually increase in size in an ever radially expanding, generally conical pattern, expanding radially outwardly away from the combustion cavity and the injection well I and upwardly in the formation 40. With reference to FIG. 3B, as the produced water is continuously injected above the combustion cavity 30 and the downhole burner 20, the injected water front 70 also increases in size in a generally conical pattern, radially outwardly away from the injection well I and downwardly in the formation 40. Thus, Applicant believes that the steam generation interface 90, or in-situ steam generation zone 100 also correspondingly increases in size at the interface between the water front 70 and the gas zone 60.

Accordingly, solids deposition within the formation increases at an ever increasing radius from the injection well, corresponding to the increasing formation of the steam zone 100. Over time, solids deposition restrict flow through the high permeability channels or wormholes while forcing the process into virgin areas of the formation.

Figure 5:
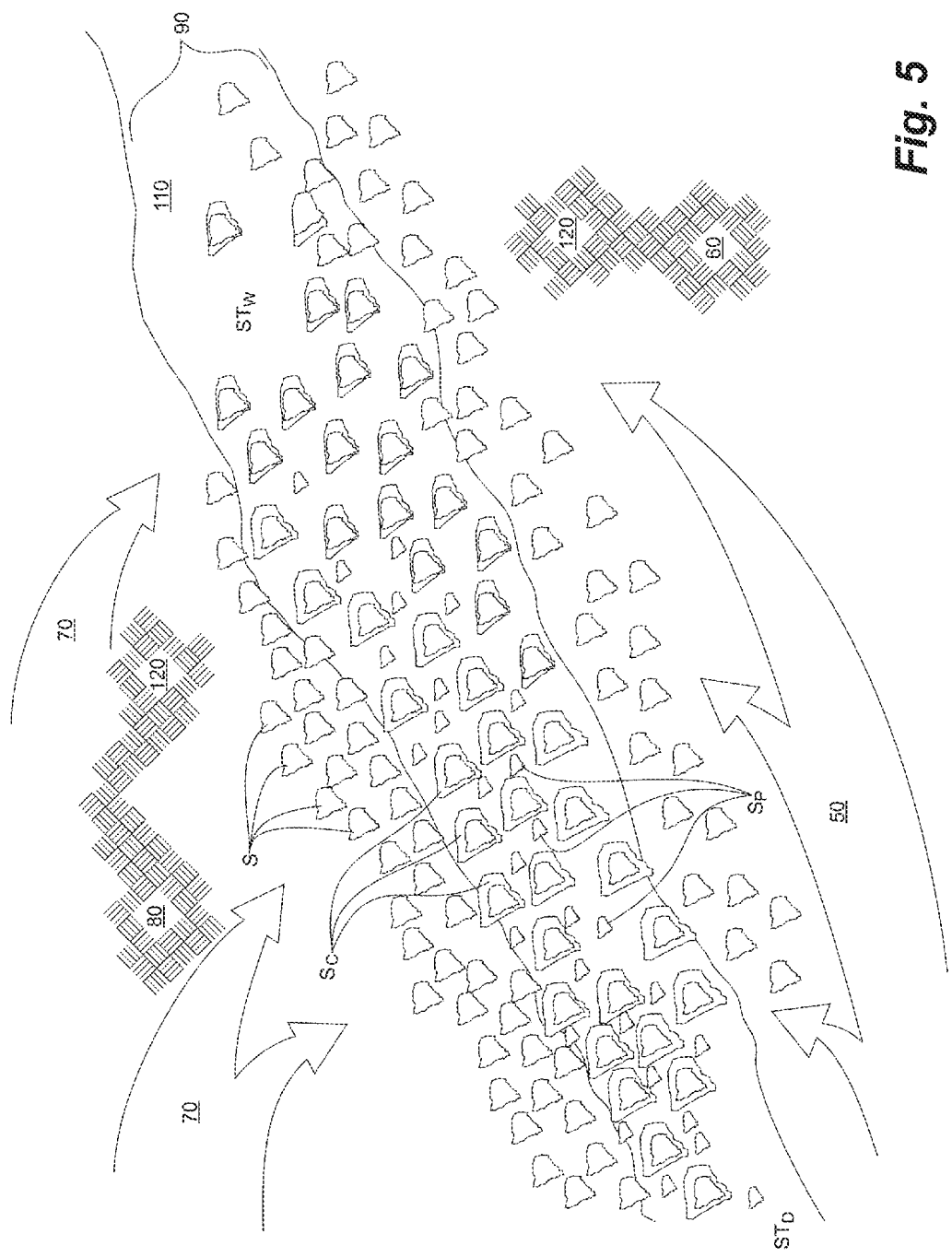
FIG. 5 is a representative drawing illustrating an increase in a solubility limit of injected water and the establishment of a saturation equilibrium along a steam generation interface as the hot flue gases travel farther away from a combustion cavity.

FIG. 5 illustrates that a steam quality decreases and the location of phase change and associated solids deposition, such as particulate formation or scaling, moves away from a heat source into higher permeability channels. Solids deposition progressively block or restrict a high permeability channel which can urge and/or redirect steam flow into lower permeability areas. As heat or energy from the hot flue gases move farther away from the heat source, the heat or energy available per unit of injected water for creating dry steam decreases. Within a certain distance from the heat source, a saturation equilibrium of dissolved solids in the inject water can be established for producing lower quality steam with suspended solids remaining in solution.

Under normal operating conditions, saturation equilibrium is maintained and the formation will experience minimal or no solids deposition or scaling. By manipulating the interaction between the injected water (downward flow from gravity affect) and hot combustion gases (upward flow due to buoyancy), at a point where the saturation equilibrium has been reached, one can initiate solids deposition within the formation. In other words, the process is self-balancing and unless the injection conditions are manipulated to exceed an equilibrium state, dissolved solids in the produced water will remain entrained therein and be carried through the EOR.

As shown, sand particles S in a high permeability channel 110 are believed to be spaced farther away from one another than sand particles S in low permeability zones 120. Steam, having a given quality, is formed along the steam generation interface 90 between the water injection zone 80 and the combustion gas zone 60. The injected water which engages the combustion zone closer to the source of heat has more heat or energy available per unit, and thus forms a higher quality or dry steam $ST_D$, as the injected water is evaporated, causing solids deposition. Injected water, farther away from the source of heat, has less heat or energy available per unit, and thus forms wet steam $ST_W$ that is of lower quality than the dry steam $ST_D$.

The dry steam $ST_D$ urges dissolved solids to precipitate out as precipitated solids $S_P$, or initiates scaling on the sand particles $S_C$ or previously precipitated solids $S_P$. Farther away from the source of heat, the wet steam $ST_W$ retains dissolved solids therein for transport through the high permeability channel 110.

Applicant believes that a person of ordinary skill in the art would understand that the temperature required for the creation of dry steam would be specific to a formation and dependent thereon.

As discussed herein, there are dissolved solids carried with the injected produced waters, which are subject to deposition, when the produced water is converted to dry stream. Further, dependent on the structure of the formation, there can be physical entrainment of solids, such as fine solids picked up and carried by the injected fluids or water. Those entrained solids will be carried until the fluid dynamics release the solids or the structure of the formation filters them from the fluids flowing therealong. Again, a predominant flow of fluids along a high permeability channel will result in the most entrained solids being released or filtered out, increasing resistance to continued flow.

Example

A typical heavy oil sand formation can have about 300 meters of overburden with about 7 meters of an unconsolidated heavy oil sands formation having about 33% porosity and about 5,000 and vertical & horizontal permeability. The formation can lie underneath consolidated shale caprock of about 10 meters deep, and above a consolidated shale bottom rock of about 6 meters deep. In such a formation, high permeability channels are known to form during CHOPS. An example of a CHOPS process includes production from a formation at a virgin pressure of about 2.8 MPa at about 18° C.

After the formation is depleted or otherwise economical primary production has been discontinued, one can employ an embodiment of the in-situ steam generation and selective solids deposition. For production of dry, hot flue gases, a downhole burner 20, such as shown in FIGS. 2-4, is run into an injection well I. Combustion is initiated, forming a combustion cavity 30 below the burner 20. Hot combustion or flue gases radiate and enter into the formation 40 from the combustion cavity 30 and permeate through the formation 40 as a gaseous drive front 50. Recycled produced water, having dissolved solids therein, is injected into the formation 40, above the combustion cavity 30 and the downhole burner 20. The injected water permeates through the formation 40 as an injected water front 70. Produced water injection also acts as a purge which pushes the products of combustion away from mechanical components of the burner 20 and injection well I for avoiding damaging factors including heat, corrosion, and erosion, major factors in the failure of well-bore steam generation.

Projected rates include injection of produced water at about 500 sm³/d (at 345 kPag at 80° C.) and heat input at about 1,117 gigajoules/day for producing steam at about 85% steam quality at a steam generation interface. Combustion can be sustained using fuel gas, from nearby pipeline gas, at about 24.2 t/d (about 35184 sm³/d at about 5000 kPag and about 45° C.) and gaseous oxygen at about 89.8 t/d (about 66395 sm³/d at about 5000 kPag and about 16° C.). The combustion products are about 114 tpd of (about 34 tpd of $CO_2$+about 90 tpd of $H_2O$) equivalent to about 124 m³pd. The above is expected to provide a design solvent to oil recovery (SOR) of about 2:1 at about 590 sm³/d of steam at about 85% steam quality, about 40 m³/d of $CO_2$ liquid equivalent and a $CO_2$ ratio to produced oil of about 0.25 tonnes per m³ oil. Heavy oil production is estimated at about 290 m³/d.

Desiring about 6 MPa maximum allowable bottom hole pressure (MABHP) at about 300° C., the flow rate of the injection of produced water can be calculated to produce wet, low quality 85% steam, for maintaining solution of the solids dissolved therein. Applicant notes that produced water having about 30,000 ppm TDS at about 30° C., at atmospheric pressure, would have a saturation limit of about 250,000 ppm TDS at about 300° C. and about 6 MPa.

Applicant believes that low quality or wet steam, such as that of about 40% up to about 85% steam quality), created from produced water having about 30,000 ppm total dissolved solids (TDS) at about 30° C., sufficiently maintains dissolved solids in solution and does not cause the solids to prematurely precipitate and deposit within the formation. The wet steam and dissolved solids permeate through the formation and, due to the higher permeability, preferentially concentrate along high permeability channels.

Assuming a zero net impact on the formation, where the amount of solids injected equals the amount of solids produced, and an insignificant volume spread over a space of about 2,500,000 m² by about 5 m thick, Applicant believes that only a small percentage of these solids would come out of solution in a balanced 85% steam quality process.

Further, when steam quality is manipulated according to one embodiment, it is believed that about 500 m³pd steam at about 100% steam quality would precipitate about 15 m³pd of total solids deposition or about 3% of the total injected volume. For deposition, and with manipulation of the water, combustion or both, within the formation, the upwardly streaming combustion gases will meet the injected and downwardly draining water at the steam generation interface to produce dry steam. The saturation point of the produced water will be exceeded (ie. the dissolved solids solubility limit of the water will be exceeded), for commencing solids deposition. Solids may deposit as particulates or scale. It is believe that grains of sand can act as crystallization seeds for scaling and/or particulate formation. The solid deposition grows along the steam generation interface. The steam results in about 3 darcie permeability through the channels. At about 20% water saturation, and about 80% oil saturation, a high quality steam, such as that greater than about 85% steam quality, or dry steam can be created to precipitate out the dissolved solids and cause solids deposition within the formation and in the channels, resulting in the production of about 11° API bitumen at about 18° C. or about 100 cp at about 80° C.

The mechanism of the dry, hot flue gases and independent water injection might be characterized as follows. Distribution of the combustion or flue gases will be radially outwardly away from the heat source, such as the downhole burner in the combustion cavity, and will spread into the surrounding area preferentially following the path of least resistance. The distribution of water flow draining down also depends on the flow resistance in the oil sand structure and will find short tracks. Each of the steam, the dry, hot flue gases, and the injected water with associated dissolved solids are distributed to the bordering regions. Both effects lead to a flow-resistance-controlled expansion, which is not necessarily an equal distribution or spherical. At the steam generation interface, much like the crystallization of salt from sea water, the water will be removed by evaporation and the dissolved solids becomes waterless and precipitated. From the combustion or "steam side" of the interface, solids are deposited.

In one typical process, EOR operations can be conducted wherein steam or flue gas drive is conducted until one or more high permeability channels are periodically encountered, the channels being remediated and drive resumed.

Referring back to FIGS. 1 and 2, and with reference to FIGS. 6A to 6F, in an embodiment, in a typical pad of 9 primary production wells $P_1$ to $P_9$, the central well $P_5$ can be used as an injection well or Injector I for providing or injecting dry, hot flue gases into the formation 30. EOR operations can be started by positioning a downhole burner 20 in the injector I and creating a combustion cavity 30. Steady state operation of the downhole burner 20 produces dry, hot combustion gases which permeate through the formation 40. Later in time, produced water can be injected into the formation 40 above the downhole burner 20 and combustion cavity 30 at a first flow rate and allowed to permeate through the formation 40 to interact with the hot combustion gases to form steam at a steam generation interface for creating wet or low quality steam front, being less than or about 85% dry stream. The steam front can permeate through the formation 40 for contacting virgin areas having heavy oil and drive the heavy oil towards one or more neighboring producers while retaining a substantial portion of the dissolved solids therein.

One or more high permeability channels may become relevant if steam breakthrough is detected or otherwise occurs at one of one or more of the neighboring producers. Such steam breakthroughs can be monitored at least one of one or more of the nearby producers to detect a reduction of preferential permeation along at least one of the one of more high permeability channels.

As better shown in FIG. 6A, steam breakthrough at Producer A can be monitored and evidenced by a property change at Producer A, such as an increase in temperature, or change in the produced fluids. If so, then the injected fluids are no longer effectively affecting the balance of the formation and hence it is desirable to remediate or block the high permeability channel.

As described above, wet steam is able to maintain dissolved solids therein for transport through the formation and into the high permeability channel. While the high permeability channel permits the wet steam to preferentially permeate or flow therealong and bypass virgin areas having heavy oil, it also carries the water and dissolved solids therealong to the steam generation interface.

Accordingly, the thermal balance in the formation is manipulated or managed to encourage deposition of dissolved solids in the high permeability channel connected to Producer A.

As shown in FIG. 6B, in an embodiment, the produced water is then injected into the formation, at a second reduced flow rate and permeates preferentially along the high permeability channel. With less water being injected into the formation, there is an increase in the ratio of the thermal load placed thereon, and accordingly, the injected water (at the second slower flow rate) is evaporated more vigorously for creating high quality steam which urges precipitation of dissolved solids and deposition thereof in the channel.

The steady state operation of the burner creates hot combustion gases that maintain substantially the same amount of energy available to create dry steam. The effect can be achieved by manipulation of one or more of the water injection and combustion rate. Interacting with a smaller volume of produced water, the hot combustion gases and the injected water at the second reduced flow rate interact to form steam at a second dry quality or dry steam. The steam generation interface formed along the high permeability channel causes the dissolved solids in the injected water to precipitate out and deposit within the formation and within the high permeability channel.

Over time, this solids deposition remediates the high permeability channel by reducing its permeability and otherwise restricting flow therethrough to Producer A. The success of the plugging or restriction of the high permeability channel to Producer A can be monitored for a reduction in the preferential permeation along the high permeability channel. This reduction can be evident in the reduced temperature and fluid response at the affected producer well. After the high permeability channel to Producer A is remediated, such as being sufficiently blocked to urge the drive front into virgin zones, the flow rate of the injected water can be returned to the first flow rate, for continued expansion of the lower quality wet steam front, urging hydrocarbon deposits from virgin zones towards neighboring producers.

Continued operation at steady state can be performed and the neighboring producers monitored for preferential permeation of steam, until for example, and as shown in FIGS. 6C and 6D, another high permeability channel to another neighboring producer, such as Producer B, might be detected. This can, once again, be evidenced by a property change at Producer B. The ideal radial influence of the steam front on the formation is adversely affected as the steam flow is lost to the channel.

In a process similar to the remediation of the high permeability channel to Producer A, the steam quality is managed for increasing the steam quality at the steam generation interface. For example, produced water can be injected at Injector I at the second flow rate for increasing the heat available per unit of water for creating dry steam. The high quality steam urges solids deposition in the high permeability channel, eventually blocking the high permeability channel to Producer B.

As before, over time, the solids deposition in the channel to Producer B, blocks, plugs, or otherwise remediates the channel and, as shown in FIGS. 6E and 6F, effectively moves the steam front into virgin areas and towards the production wells.

Creation of wet steam and permitting wet steam to permeate through the formation before initiating solids deposition with dry steam urges targeting of high permeability channels with solids for deposition.

Further still, in another embodiment, this process can be used with for remediating an oil formation having channels, other types of high permeability zones, such as thief zones, or zones that reduce the effectiveness of an EOR heat or steam front from contacting virgin areas having hydrocarbon or oil remaining therein.

Further still, in another embodiment, Applicant believes this process can be used for remediating high permeability pathways within a formation which permit preferential yet undesirable flow of fluids between a production well and a water or gas zone, such as those high permeability pathways found in water or gas coning.

The embodiments of the invention for which an exclusive property or privilege is claimed are defined as follows:

1. A method for remediating high permeability channels in a hydrocarbon-bearing formation of a hydrocarbon reservoir comprising:
   heating the formation containing one or more of the high permeability channels;
   injecting water containing dissolved solids into the formation;
   forming a steam front in the formation; and
   managing steam quality at the steam front for forming a steam generation interface intersecting one or more of the high permeability channels for forming particulates in the high permeability channels and controlling deposition of the formed particles within the high permeability channels and reducing the permeability therealong.

2. The method of claim 1 for remediating high permeability channels wherein:
   the heating of the formation comprises injecting dry, hot flue gases into the formation from an injection well for creating a dry gaseous drive front, the gaseous drive front expanding radially outwardly away from the injection well and generally upwardly in the formation;
   the injecting water containing dissolved solids comprises injecting the water into the formation above the dry gaseous drive front for creating an injected water front expanding radially outwardly away from the injection well and generally downwardly in the formation, at least a portion of the injected water travelling along the high permeability channels; and
   the forming of the steam generation interface is between the dry gaseous drive front and the injected water front, the steam generation interface being spaced away from the injection well.

3. The method of claim 1, wherein the heating the formation further comprises operating a downhole burner.

4. The method of claim 2, wherein the heating the formation further comprises operating a downhole burner within the formation for producing the dry, hot flue gases.

5. The method of claim 4, wherein the heating the formation further comprises forming a combustion cavity below the downhole burner.

6. The method of claim 1, wherein managing a quality of the steam at the steam generation interface further comprises:
   injecting the water at a first flow rate for creating steam at a first wet quality at the steam generation interface for retaining a substantial portion of the dissolved solids therein, and
   injecting the water at a second reduced flow rate for creating steam at a second dry quality at the steam generation interface for initiating precipitation of the dissolved solids at the steam generation interface.

7. The method of claim 6, wherein the second dry quality steam further comprises steam having a steam quality greater than about 85% dry.

8. The method of claim 6, further comprising permitting the first wet quality steam to permeate along the high permeability channels before creating steam at the second dry flow rate.

9. The method of claim 1, wherein managing a quality of the steam further comprises increasing the heating of the formation for moving the steam generation interface further away from the injection well.

10. The method of claim 1, wherein the managing a quality of the steam further comprises decreasing a rate of water injection for moving the steam generation interface further away from the injection well.

11. The method of claim 1, wherein the water containing dissolved solids is produced water.

12. The method of claim 1, wherein initiating precipitation and controlling deposition of the dissolved solids further comprises scaling in the high permeability channels.

13. The method of claim 1 for remediating high permeability channels wherein the high permeability channels are high permeability pathways formed between a production well and a water or gas zone.

14. A method of enhanced oil recovery from a heavy hydrocarbon-bearing formation having to one or more high permeability channels comprising:
   heating the formation with a downhole burner by injecting dry, hot flue gases from an injection well for creating a dry gaseous drive front, the gaseous drive front expanding radially outwardly away from the injection well and generally upwardly in the formation;
   injecting water containing dissolved solids into the formation, above the downhole burner, for creating an injected water front expanding radially outwardly away from the injection well and generally downwardly in the formation, at least a portion of the injected water travelling along the high permeability channels;
   forming steam within the formation at a steam generation interface occurring between the dry gaseous drive front and the injected water front, the steam generation interface being spaced away from the injection well; and
   managing a quality of the steam at the steam generation interface by
   creating steam at a first wet quality at the steam generation interface for driving heavy hydrocarbons towards one or more neighboring producers while retaining a substantial portion of the dissolved solids therein,
   detecting preferential permeation along at least one of the one or more high permeability channels,
   creating steam at a second dry quality at the steam generation interface for initiating precipitation of the dissolved solids at the steam generation interface and into at least the at least one high permeability channels for reducing the preferential permeation therealong.

15. The method of claim 14 wherein the detecting steam breakthrough further comprises:
   monitoring at least one of the one or more neighboring producers for detecting steam breakthrough.

16. The method of claim 15 further comprising:
   monitoring the one or more neighboring producers for a reduction in the preferential permeation along the at least one of the one or more high permeability channels, and if so reduced, then creating steam at the first wet quality at the steam generation interface for driving heavy hydrocarbons towards one or more neighboring producers.

17. The method of claim 16 further comprising:

repeating the managing of the quality of the steam at the steam generation interface by creating steam at a first wet quality at the steam generation interface for driving heavy hydrocarbons towards one or more neighboring producers, detecting preferential permeation along at least one of the one or more high permeability channels, creating steam at a second dry quality at the steam generation interface for initiating precipitation of the dissolved solids at the steam generation interface and into at least the at least one high permeability channels for reducing the preferential permeation therealong, and monitoring the one or more neighboring producers for a reduction in the preferential permeation along the at least one of the one or more high permeability channels, and if so reduced, then creating steam at the first wet quality at the steam generation interface for driving heavy hydrocarbons towards one or more neighboring producers.

* * * * *